(12) United States Patent
Schrader et al.

(10) Patent No.: US 10,493,304 B2
(45) Date of Patent: Dec. 3, 2019

(54) AIRCRAFT LAVATORY OXYGEN SOURCE

(71) Applicant: B/E Aerospace, Inc., Wellington, FL (US)

(72) Inventors: Adam Lee Schrader, Lawrence, KS (US); Kenneth Michael Murta, Overland Park, KS (US); Bryan Nicholas Rogers, Kearny, MO (US); Mark Wesley McLelland, Lees Summit, MO (US)

(73) Assignee: B/E Aerospace, Inc., Winston-Salem, NC (US)

( * ) Notice: Subject to any disclaimer, the term of this patent is extended or adjusted under 35 U.S.C. 154(b) by 306 days.

(21) Appl. No.: 14/073,590

(22) Filed: Nov. 6, 2013

(65) Prior Publication Data

US 2014/0137869 A1 May 22, 2014

Related U.S. Application Data

(60) Provisional application No. 61/724,772, filed on Nov. 9, 2012.

(51) Int. Cl.
*A62B 7/02* (2006.01)
*A62B 9/04* (2006.01)
*A62B 7/14* (2006.01)

(52) U.S. Cl.
CPC ............... *A62B 7/02* (2013.01); *A62B 7/14* (2013.01); *A62B 9/04* (2013.01); *B64D 2231/02* (2013.01)

(58) Field of Classification Search
CPC .... A62B 7/02; A62B 7/14; A62B 9/04; B64D 2231/02; B64D 2231/025

(Continued)

(56) References Cited

U.S. PATENT DOCUMENTS 1,559,156 A * 10/1925 Bullock .................... G01F 1/42
                                                                    138/44
1,915,867 A *  6/1933 Penick .............. F16L 55/02736
                                                                    138/42

(Continued)

FOREIGN PATENT DOCUMENTS

EP           2151263 A1    2/2010
EP           2286877 A1    2/2011

(Continued)

OTHER PUBLICATIONS

General Flow Products, Orifice Plates, Aug. 2008.*

(Continued)

*Primary Examiner* — Tan-Uyen T Ho
*Assistant Examiner* — Margaret M Luarca
(74) *Attorney, Agent, or Firm* — Donna P. Suchy

(57) ABSTRACT

An aircraft lavatory oxygen source includes an oxygen storage vessel having a manifold, and an actuator configured to break a pressure seal of the oxygen storage vessel to initiate a flow of oxygen. A flow path in the manifold includes one or more oxygen flow rate control orifices, and may include a variable orifice to control oxygen flow rate and pressure through an outlet of the manifold. The outlet includes a swivel connector fitting that rotates 360 degrees, and one or more oxygen distribution tubes connected with one or more removably attachable connectors, directly to the outlet, between portions of the tube, or to a breathing mask. The actuator can include a spring loaded mechanism, a pyrotechnic mechanism, an electrically powered solenoid or a pneumatic pressure initiated device.

21 Claims, 14 Drawing Sheets

(58) Field of Classification Search
USPC .................................................. 128/205.21
See application file for complete search history.

(56) References Cited

U.S. PATENT DOCUMENTS

| | | | | |
|---|---|---|---|---|
| 2,664,109 | A * | 12/1953 | Iager | F16L 55/02736 138/42 |
| 2,931,355 | A | 4/1960 | Miller et al. | |
| 3,981,300 | A | 9/1976 | Williams | |
| 4,481,945 | A | 11/1984 | Levine et al. | |
| 4,681,602 | A | 7/1987 | Glenn et al. | |
| 4,715,395 | A * | 12/1987 | Mainelli | F02C 9/263 138/42 |
| 5,246,201 | A * | 9/1993 | Messick | G01F 1/42 251/205 |
| 5,301,665 | A | 4/1994 | Jumpertz et al. | |
| 5,795,018 | A | 8/1998 | Schumacher et al. | |
| 5,803,062 | A | 9/1998 | Aulgur et al. | |
| 5,809,999 | A | 9/1998 | Lang | |
| 5,984,415 | A | 11/1999 | Schumacher et al. | |
| 6,247,471 | B1 * | 6/2001 | Bower | A62B 7/02 128/201.23 |
| 6,467,483 | B1 * | 10/2002 | Kopacko | A61M 16/06 128/205.25 |
| 6,647,982 | B1 * | 11/2003 | Zaiser | A61M 16/10 128/204.18 |
| 6,962,167 | B2 * | 11/2005 | Rogalski | F16K 3/08 137/599.05 |
| 7,588,032 | B2 | 9/2009 | Cannon | |
| 7,784,463 | B2 | 8/2010 | Cannon | |
| 7,866,345 | B2 * | 1/2011 | Lowery | G01F 1/40 138/37 |
| 8,016,232 | B2 | 9/2011 | Anderson et al. | |
| RE46,600 | E * | 11/2017 | Albizuri | |
| 2005/0263156 | A1 | 12/2005 | Westphal et al. | |
| 2006/0048777 | A1 * | 3/2006 | Brookman | A62B 7/02 128/201.22 |
| 2007/0084463 | A1 * | 4/2007 | Niemann | A61M 16/06 128/201.25 |
| 2008/0257928 | A1 * | 10/2008 | Lowry | A45F 3/04 224/638 |
| 2009/0188504 | A1 * | 7/2009 | Siska, Jr. | A62B 7/14 128/205.21 |
| 2010/0024821 | A1 * | 2/2010 | Rittner | B64D 10/00 128/204.29 |
| 2012/0111871 | A1 * | 5/2012 | Sitabkhan | A62B 7/14 220/562 |
| 2013/0317452 | A1 * | 11/2013 | Heald | A61M 5/31545 604/246 |

FOREIGN PATENT DOCUMENTS

| | | |
|---|---|---|
| JP | 04-296294 | 10/1992 |
| JP | 2002-543936 | 12/2002 |
| JP | 2003-227480 | 8/2003 |
| JP | 2009-538771 | 11/2009 |
| JP | 2011-241971 | 12/2011 |
| WO | 9743178 A1 | 11/1997 |
| WO | WO-2011/009079 | 1/2011 |
| WO | WO-2011/154489 A1 | 12/2011 |

OTHER PUBLICATIONS

Pressure Drop Control, Kim, H., Setoguchi, T., Matsuo, S. et al. J. of Therm. Sci. (2001) 10: 309.*
International Search Report, dated Aug. 4, 2014, 3 pages.
Robert Hettman, Memorandum: Equivalent Level of Safety (ELOS) Finding for the Airbus Model A350 series Passenger Oxygen System (FAA Project No. TC05441B-T), Federal Aviation Administration, Jan. 7, 2011, 3 pages, USA.
Airworthiness Directives; Various Transport Category Airplanes Equipped With Chemical Oxygen Generators Installed in a Lavatory, Federal Aviation Administration, Mar. 8, 2011, vol. 76, No. 45, pp. 12556-12558, USA.
David Murphy, FAA Disables Oxygen Masks in Aircraft Bathrooms, pcmag.com, Mar. 12, 2011, 1 page, USA.
Pulse® Oxygen Technology, B/E Aerospace, Inc., Mar. 21, 2012, 1 page, USA.

* cited by examiner

AIRCRAFT LAVATORY OXYGEN SOURCE

RELATED APPLICATIONS

This application claims the benefit of priority to provisional application 61/724,772, filed on Nov. 9, 2012, which is incorporated herein by reference.

BACKGROUND OF THE INVENTION

The present invention generally relates to emergency oxygen supply systems such as are routinely carried on commercial aircraft for deployment upon loss of cabin pressure. More particularly, the invention pertains to an aircraft lavatory oxygen source to be used in the event of a decompression, to prevent an effect known as hypoxia.

Emergency oxygen supply systems are commonly installed on aircraft for the purpose of supplying oxygen to passengers upon loss of cabin pressure at altitudes above about 10,000 feet. Such systems typically include a face mask adapted to fit over the mouth and nose which is released from an overhead storage compartment when needed. Supplemental oxygen delivered by the mask increases the level of blood oxygen saturation in the mask user beyond what would be experienced if ambient air were breathed at the prevailing cabin pressure altitude condition. The flow of oxygen provided thereby is calculated to be sufficient to sustain all passengers until cabin pressure is reestablished or until a lower, safer altitude can be reached.

Passenger aircraft have typically provided passenger cabin areas as well as passenger lavatories with an oxygen supply with emergency oxygen masks that drop down to provide oxygen to passengers in the event of decompression of the aircraft at high altitudes. One conventional system for supplying oxygen to an aircraft cabin is known that includes a plurality of chemical oxygen generators with igniters and sequencers for energizing the igniters in sequence, and oxygen masks to which the chemical generators distribute the oxygen generated. A pressure sensor in part of the distribution system controls the sequencers to energize the igniter of the next chemical generator in sequence whenever the pressure drops below a threshold. Another conventional system for supplying emergency oxygen for passengers in aircraft is known that includes a mounting container that accommodates at least one breathing mask and an exothermic chemical oxygen generator connected to the breathing mask.

However, for certain passenger-carrying transport category airplanes with a passenger capacity of 20 or more, the Federal Aviation Authority (FAA) recently required either activating all chemical oxygen generators in the lavatories of the aircraft until the generator oxygen supply is expended, or removing the oxygen generators, and removing or re-stowing the oxygen masks and closing the mask dispenser door in the lavatories after the generator is expended or removed, to eliminate a potential hazard from placement of the chemical oxygen generators in the aircraft lavatories. Flight attendants are currently being instructed to check if lavatories are occupied in when a cabin depressurization occurs, to attempt to provide assistance to any occupants of the lavatories in quickly obtaining emergency oxygen. However, locking of lavatory doors by lavatory occupants and collapsing of lavatory occupants during such a cabin depressurization incident can potentially at least interfere with the rendering of assistance in obtaining emergency oxygen to lavatory occupants by flight attendants.

More recently, however, upon further review, the FAA required installation of an alternative supplemental oxygen system in each lavatory. It would therefore be desirable to provide a lavatory oxygen system to provide an aircraft lavatory oxygen source for such a supplemental oxygen system, in order to comply with current FAA requirements, in order to supply gaseous oxygen via a calibrated flow port. The present invention meets these and other needs.

SUMMARY OF THE INVENTION

Briefly and in general terms, the present invention provides for an aircraft lavatory oxygen source for use in an aircraft lavatory, including an oxygen storage vessel, a manifold connected with the oxygen storage vessel, and an actuator configured to break a pressure seal of the oxygen storage vessel to initiate a flow of oxygen.

The present invention accordingly provides for an aircraft lavatory oxygen source for use in an aircraft lavatory to dispense supplemental oxygen suitable for breathing by a user in small quantities, including an oxygen storage vessel configured to store gaseous oxygen at a first oxygen pressure and having suitable purity for breathing, a manifold connected in fluid communication with an opening of the oxygen storage vessel, and an actuator configured to initiate a flow of oxygen through the opening of the oxygen storage vessel.

In one presently preferred aspect, the oxygen storage vessel is configured to store gaseous oxygen at a first oxygen pressure and having suitable purity for breathing, the oxygen storage vessel having an opening sealed by a pressure seal configured to retain high pressure oxygen in the oxygen storage vessel at the first oxygen pressure, the pressure seal being configured to seal the oxygen storage vessel against flow from the oxygen storage vessel until the pressure seal is broken. In another presently preferred aspect, the oxygen storage vessel is formed of metal, such as a corrosion resistant stainless steel cylinder.

The manifold preferably is connected in fluid communication with the pressure seal of the opening of the oxygen storage vessel and configured to receive a flow of oxygen from the opening of the oxygen storage vessel when the pressure seal is broken. The manifold includes an oxygen flow path including an outlet connected in fluid communication with the pressure seal of the oxygen storage vessel. In another presently preferred aspect, the outlet of the manifold includes one or more oxygen flow rate control orifices configured to control oxygen flow rate through the outlet to deliver a defined amount of oxygen at a second oxygen pressure lower than the first oxygen pressure to support human physiological sustenance requirements at defined aircraft altitudes, time intervals and aircraft decent profiles, or time release characteristics. In another presently preferred aspect, the manifold also includes a pressure relief port connected in fluid communication with the oxygen flow path.

The actuator preferably is configured to break the pressure seal, and the pressure seal is configured to be broken, fractured or ruptured by the actuator upon activation of the actuator to initiate a flow of oxygen through the opening of the oxygen storage vessel. In a presently preferred aspect, the pressure seal comprises a frangible disk formed of frangible material configured for retaining high pressure oxygen and capable of being fractured or ruptured to open the oxygen storage vessel and initiate the flow of oxygen from the oxygen storage vessel. In another presently preferred aspect, the frangible disk is compressed between the manifold and the opening of the oxygen storage vessel, such that the frangible disk provides a seal surface and rupture point for the oxygen storage vessel.

In one presently preferred aspect, the one or more oxygen flow rate control orifices include a single flow control orifice. In another presently preferred aspect, the one or more oxygen flow rate control orifices include a plurality of flow control orifices, which are preferably arranged sequentially in the flow path. In another presently preferred aspect, the one or more oxygen flow rate control orifices include a variable orifice, such as a pressure reducer, for example, configured to control oxygen flow rate and pressure through the outlet to deliver a defined amount of oxygen to support human physiological sustenance requirements at defined aircraft altitudes, time intervals and aircraft decent profiles, or time release characteristics.

In another presently preferred aspect, the outlet of the manifold includes a swivel connector fitting configured to be connected to one or more outlet hoses for one or more breathing masks configured to be used in the aircraft lavatory. In a presently preferred aspect, the swivel connector fitting is configured to rotate 360 degrees. In another presently preferred aspect, the outlet of the manifold further includes one or more oxygen distribution tubes removably attached to the outlet. In another presently preferred aspect, the one or more oxygen distribution tubes include one or more removably attachable connectors, which can be removably connected to the outlet, can be removably connected between portions of the one or more oxygen distribution tubes, and can be removably connected to a breathing mask. In another presently preferred aspect, the aircraft lavatory oxygen source includes one or more breathing masks in the aircraft lavatory connected to receive the flow of oxygen at the second oxygen pressure from the outlet of the manifold.

In one presently preferred aspect, the actuator includes a metal wedge shaped needle configured to mechanically break the frangible disk, and the opening of the oxygen storage vessel is formed of metal, wherein the actuator is configured to wedge the metal wedge shaped needle into the metal opening of the oxygen storage vessel, such that the metal wedge shaped needle and the opening of the oxygen storage vessel form a metal on metal wedge seal upon activation of the actuator configured to guide a flow of oxygen from the oxygen storage vessel through the outlet. In another presently preferred aspect, the actuator includes a spring loaded mechanism configured to cause the needle to puncture the pressure seal, wherein the spring loaded mechanism provides a spring force sufficient to force the needle through the pressure seal to allow oxygen to flow through the flow path. In another presently preferred aspect, the spring loaded mechanism includes a wave spring configured to create activation force. In another presently preferred aspect, the actuator includes a pyrotechnic mechanism to initiate the flow of high pressure oxygen by puncturing the pressure seal, and the pyrotechnic device provides a force sufficient to force the needle through the frangible disk allowing oxygen to flow forces needle through the frangible disk allowing oxygen to flow. In another presently preferred aspect, the actuator includes an electrically powered solenoid configured to cause the needle to puncture the pressure seal, wherein the electrically powered solenoid provides a force sufficient to force the needle through the frangible disk allowing oxygen to flow. In another presently preferred aspect, the actuator includes a pneumatic pressure initiated device configured to cause the needle to puncture the pressure seal, wherein the pneumatic pressure initiated device provides a force sufficient to force the needle through the frangible disk allowing oxygen to flow.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
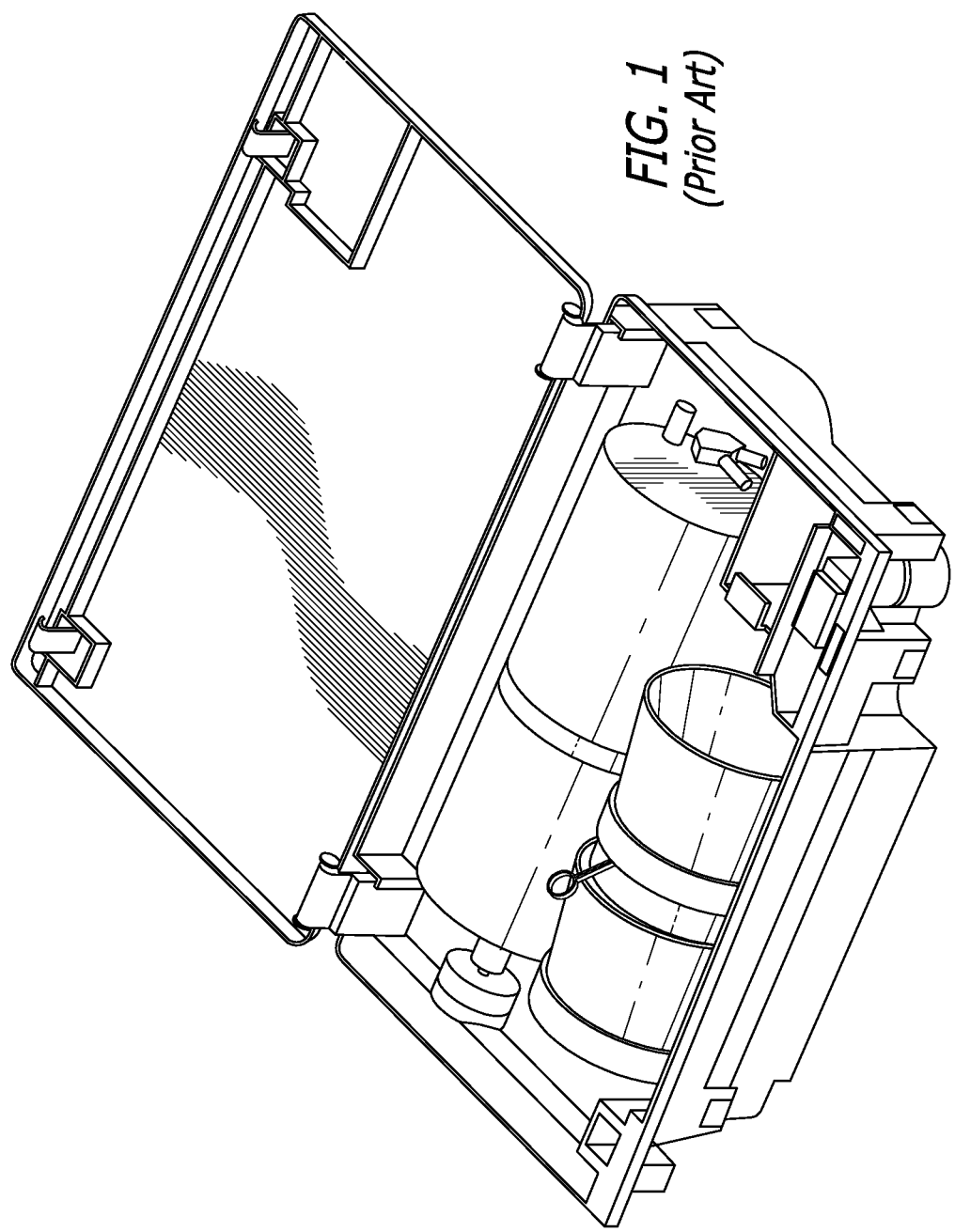
FIG. 1 is a perspective view of a prior art chemical oxygen source with oxygen masks in an oxygen module container.
Figure 2:
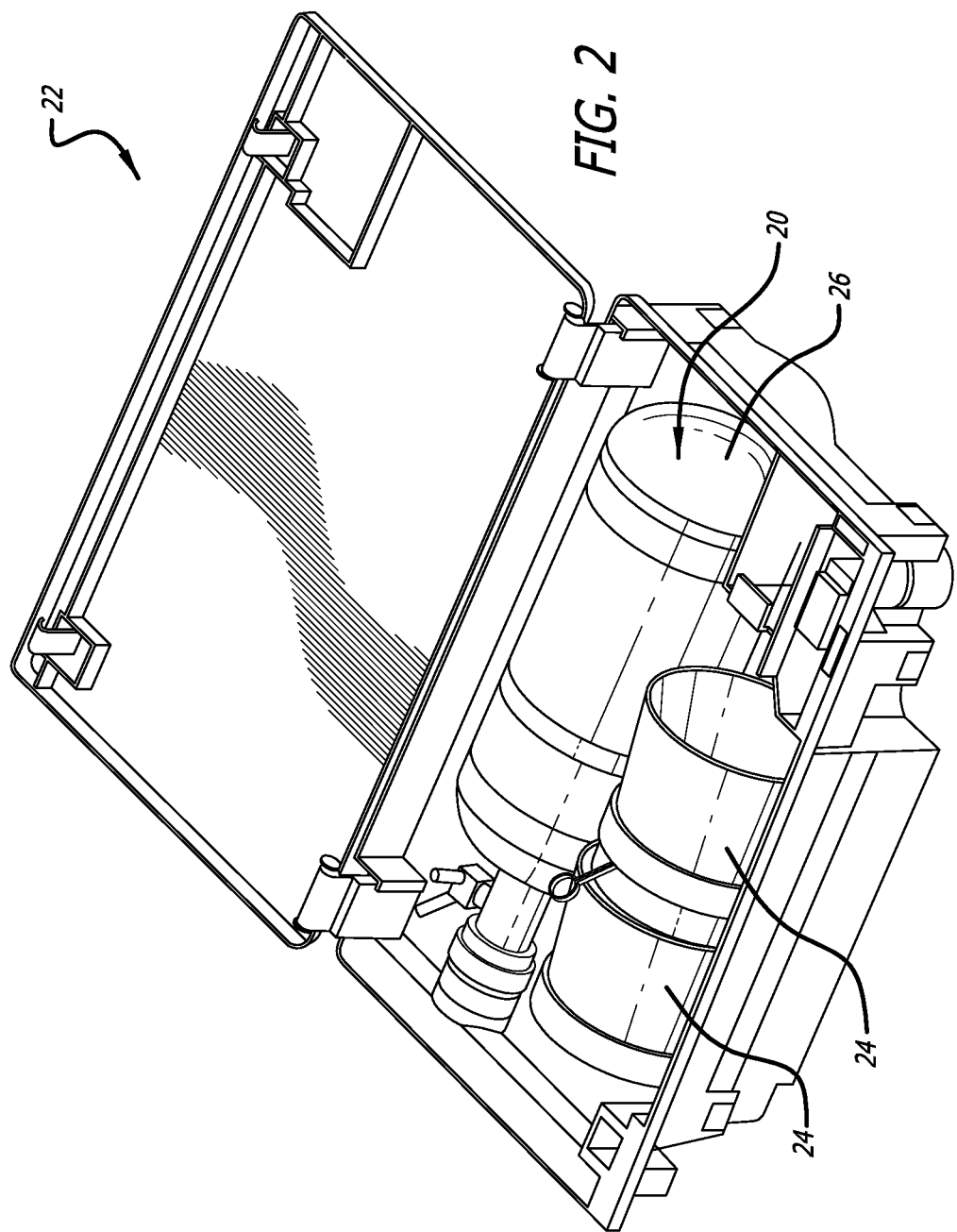
FIG. 2 is a perspective view of a high pressure gaseous oxygen source with oxygen masks in an oxygen module container, according to the present invention.
Figure 3:
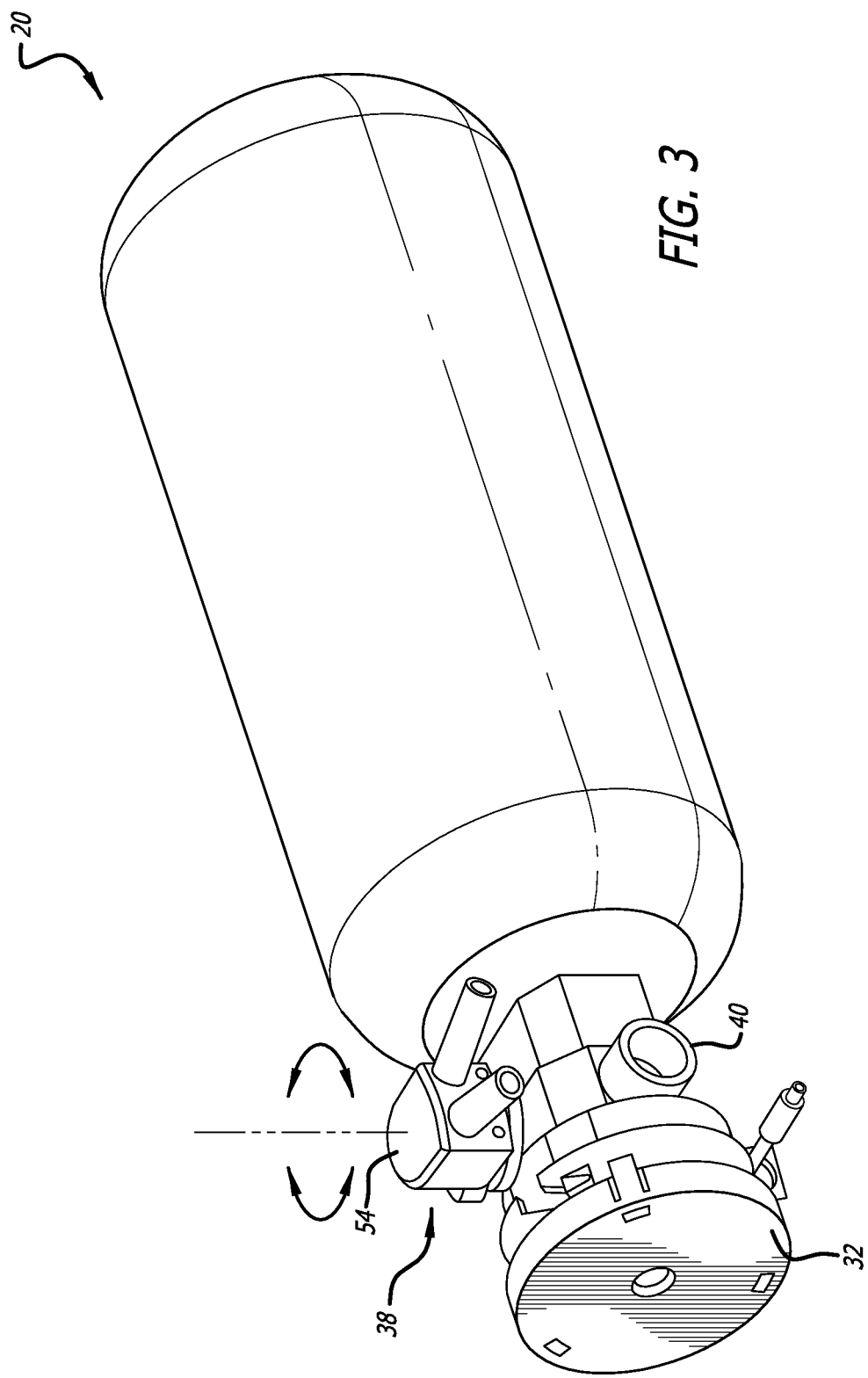
FIG. 3 is a perspective view of an oxygen storage vessel for the high pressure gaseous oxygen source of FIG. 2, with a rotatable swivel fitting for outlet hoses of an oxygen module, according to the present invention.
Figure 4:
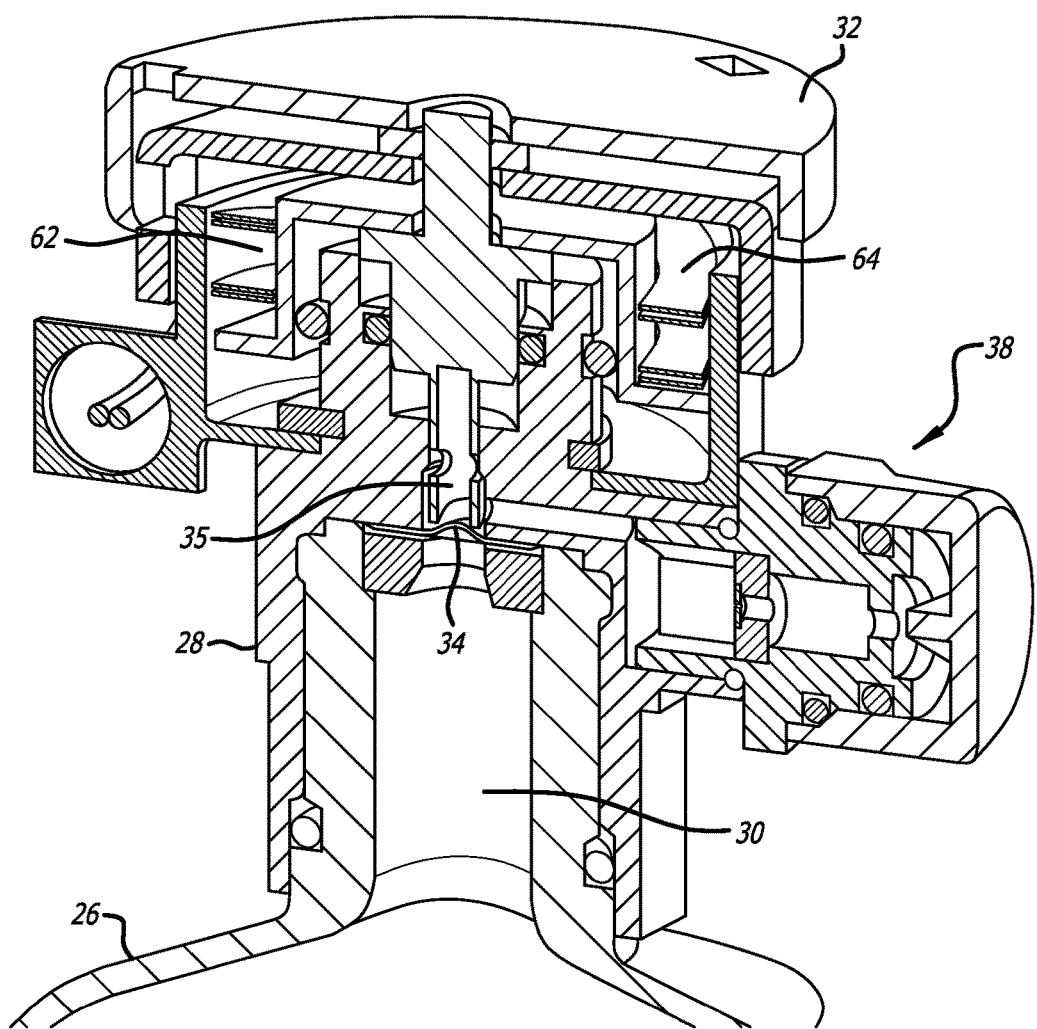
FIG. 4 is a sectional view illustrating a spring loaded actuator for breaking a pressure seal of the oxygen storage vessel of FIG. 3 to initiate a flow of oxygen, according to the present invention.

Referring to the drawings, which are provided by way of example, and not by way of limitation, the present invention provides for an aircraft lavatory oxygen source 20 for use in an aircraft lavatory to dispense supplemental oxygen suitable for breathing by a user in small quantities. The aircraft lavatory typically includes an oxygen module container 22 in the aircraft lavatory, or a personal service unit (PSU) including such an oxygen module, with one or more breathing masks 24, shown in FIG. 2, as will be explained further hereinbelow. Referring to FIGS. 2-4, the aircraft lavatory oxygen source of the invention includes an oxygen storage vessel 26 configured to store gaseous oxygen at a first oxygen pressure and having suitable purity for breathing, a manifold 28 connected in fluid communication with an opening 30 of the oxygen storage vessel, and an actuator 32 configured to initiate a flow of oxygen through the opening of the oxygen storage vessel. The opening of the oxygen storage vessel is sealed by a pressure seal 34 that seals and retains oxygen in the oxygen storage vessel at the first, high pressure, until the pressure seal is broken. The actuator preferably includes a portion configured for penetrating the pressure seal, such as a hollow, ported needle 35, for example, that can move to break the pressure seal of the oxygen storage vessel when the actuator is activated, and the pressure seal is correspondingly configured to be broken, fractured or ruptured by the actuator mechanism upon activation of the actuator to initiate a flow of oxygen through the opening of the oxygen storage vessel. The one or more breathing masks can be provided in the aircraft lavatory, connected to receive the flow of oxygen at the second oxygen pressure from the outlet of the manifold, and can be released to drop down from the oxygen module, such as in the event of decompression of the aircraft at high altitudes.

Figure 6:
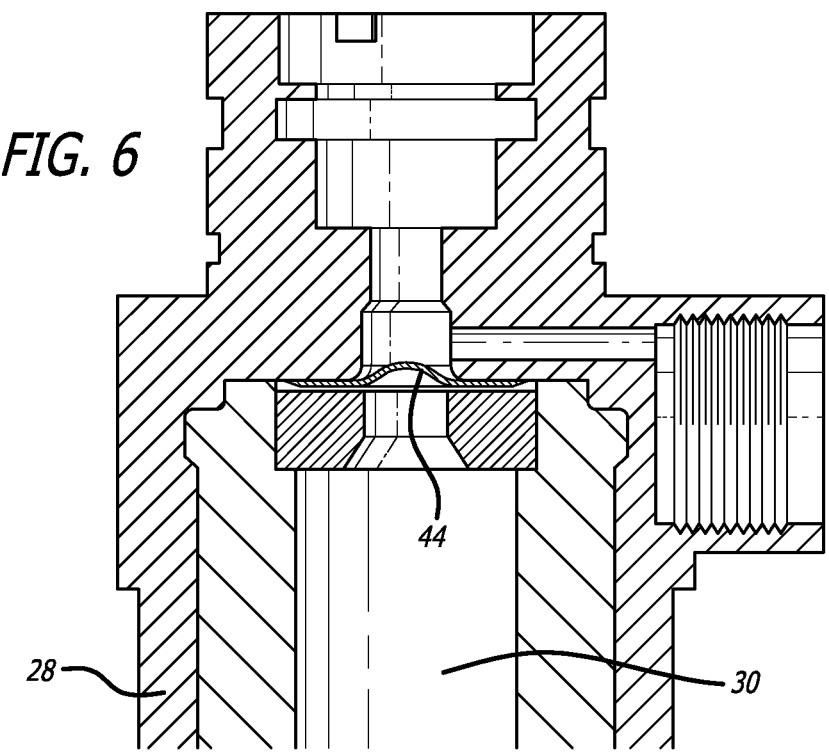
FIG. 6 is a sectional view illustrating a frangible disk formed of frangible material utilized as the pressure seal for retaining high pressure oxygen and capable of being fractured or ruptured to open the oxygen storage vessel and initiate the flow of oxygen from the oxygen storage vessel of FIG. 3 to initiate a flow of oxygen, according to the present invention.
Figure 7:
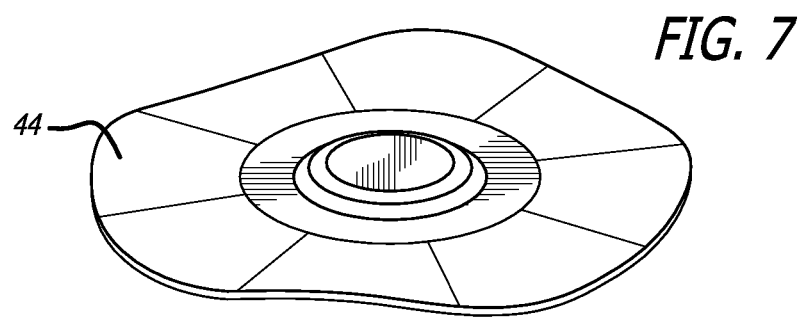
FIG. 7 is a perspective view of the frangible disk of FIG. 6.
Figure 11:
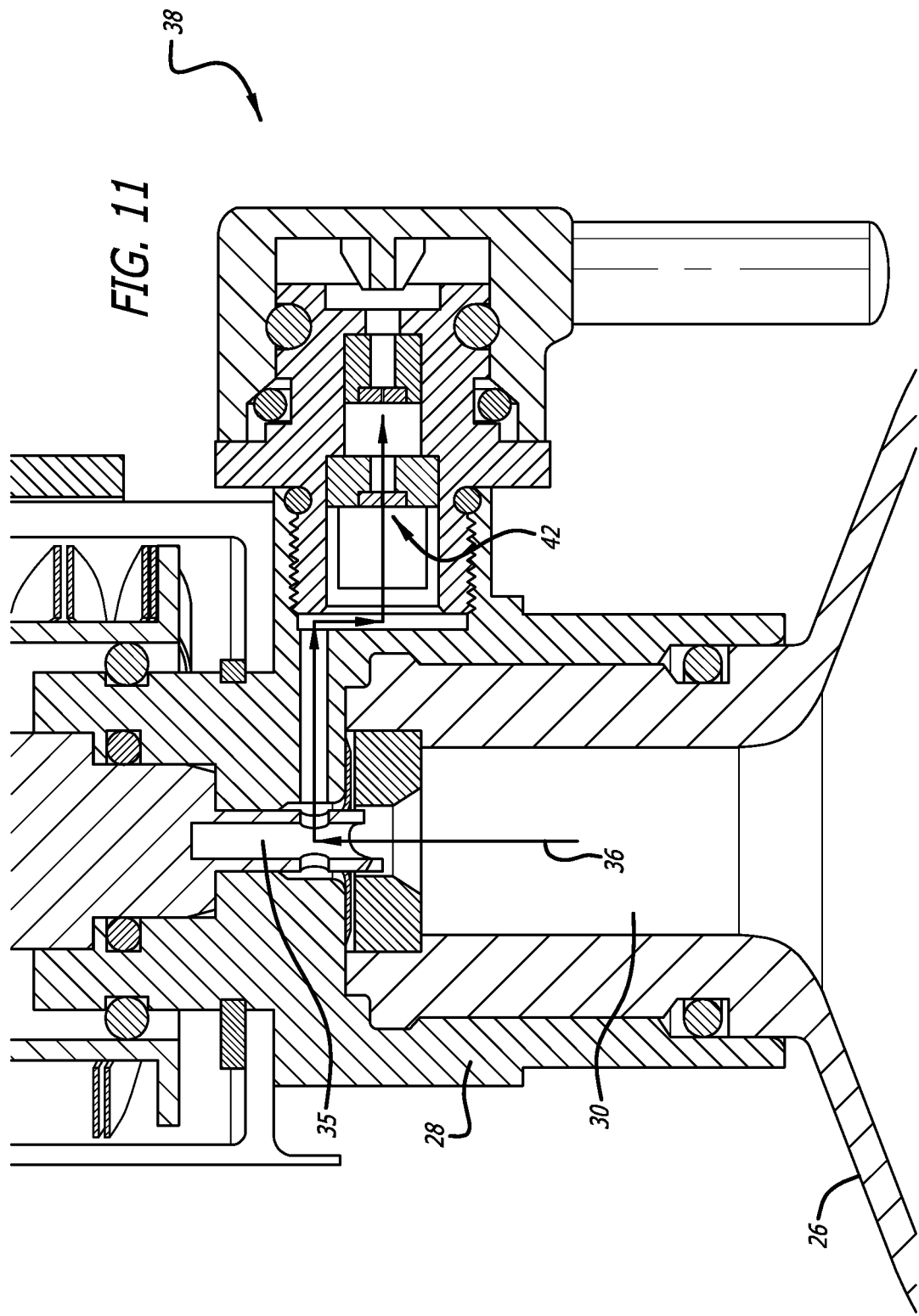
FIG. 11 is a sectional view illustrating the oxygen flow path in a manifold for one or more flow control orifices with oxygen flow initiated in the oxygen flow path connected with the opening of the oxygen storage vessel of FIG. 3, according to the present invention.
Figure 12:
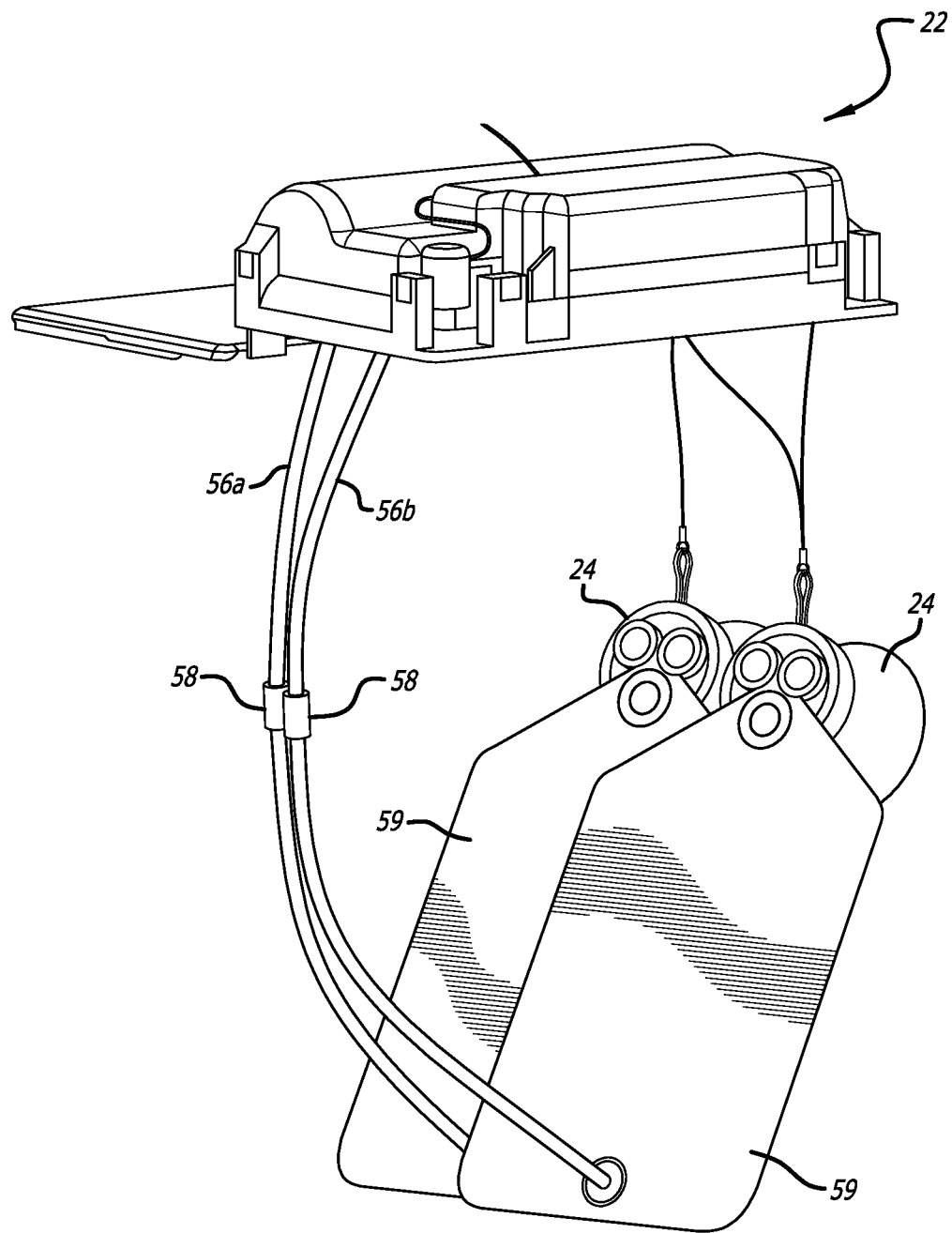
FIG. 12 is a perspective view illustrating an oxygen module with breathing masks that can be released to drop down from the oxygen module, with oxygen distribution tubes removably attached to the outlet of the oxygen source by removably attachable connectors, according to the present invention.

The manifold is also preferably connected in fluid communication with the pressure seal of the opening of the oxygen storage vessel, and is configured to receive a flow of oxygen from the opening of the oxygen storage vessel when the pressure seal is broken. The manifold includes an oxygen flow path 36, shown in FIG. 11, and an outlet 38 connected in fluid communication with the pressure seal of the oxygen storage vessel. The manifold may also include a pressure relief port 40 connected in fluid communication with the oxygen flow path. The outlet of the manifold also preferably includes one or more oxygen flow rate control orifices 42 configured to control oxygen flow rate through the outlet to deliver a defined amount of oxygen at a second pressure, lower than the first, high oxygen pressure, to support human physiological sustenance requirements at defined aircraft altitudes, time intervals and aircraft decent profiles, or time release characteristics. Referring to FIGS. 6 and 7, in a presently preferred aspect, the pressure seal is a frangible disk 44 formed of frangible material configured for retaining high pressure oxygen and capable of being fractured or ruptured by the needle of the actuator to open the oxygen storage vessel and initiate the flow of oxygen from the oxygen storage vessel. The frangible disk is compressed between the manifold and the opening of the oxygen storage vessel, such that the frangible disk provides a seal surface and rupture point for the oxygen storage vessel.

Figure 8:
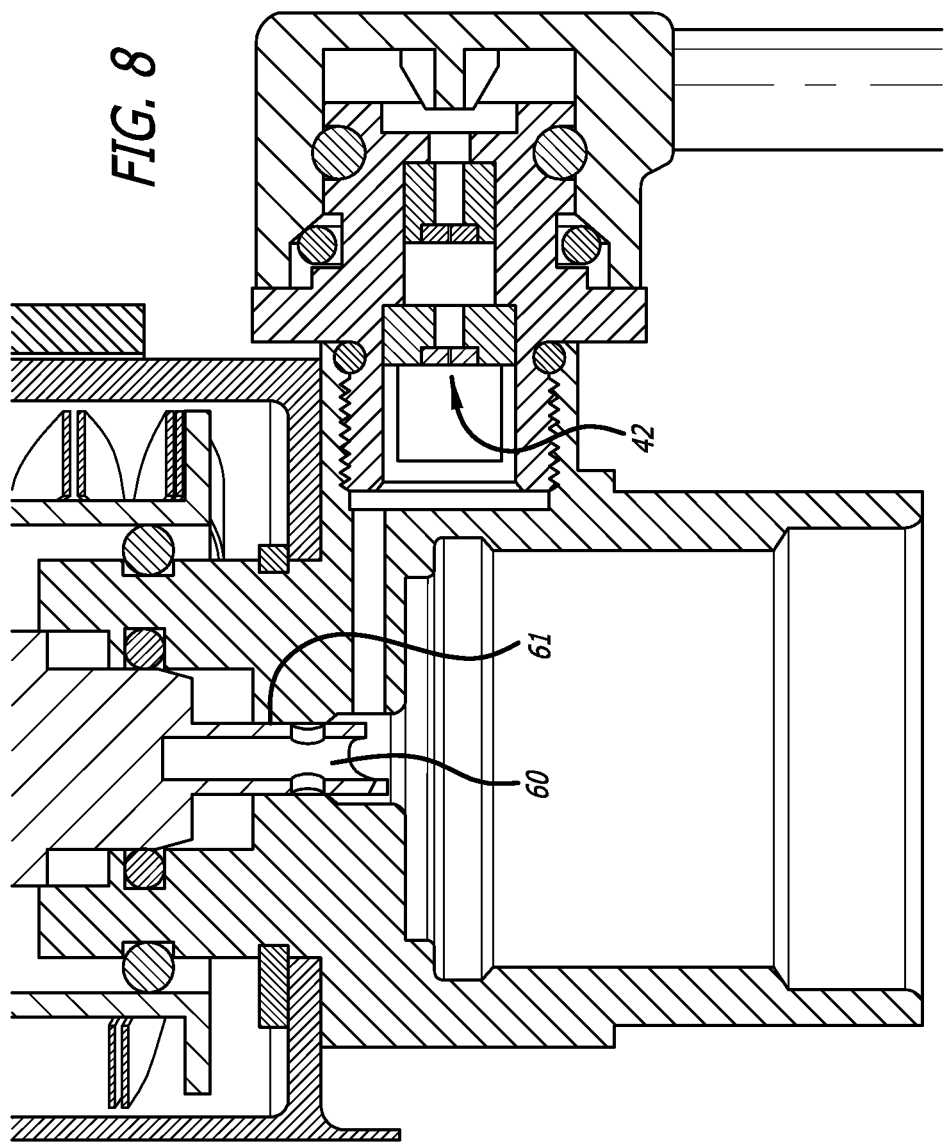
FIG. 8 is a sectional view illustrating a metal wedge shaped needle and the opening of the oxygen storage vessel forming a metal on metal "wedge" seal upon activation of an actuator, to guide a flow of oxygen from the oxygen storage vessel through the outlet, according to the present invention.
Figure 9:
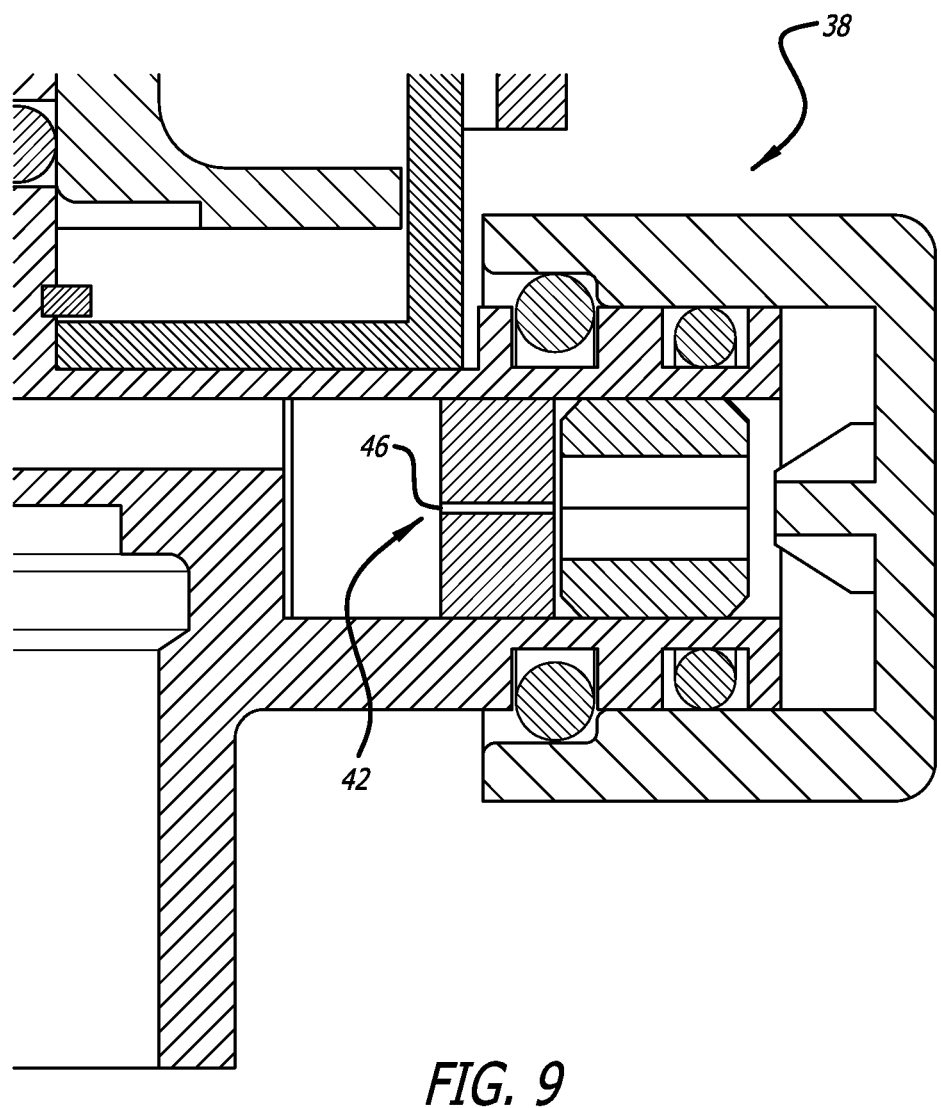
FIG. 9 is a sectional view illustrating a manifold including a single flow control orifice in the oxygen flow path connected with the opening of the oxygen storage vessel of FIG. 3, according to the present invention.
Figure 10:
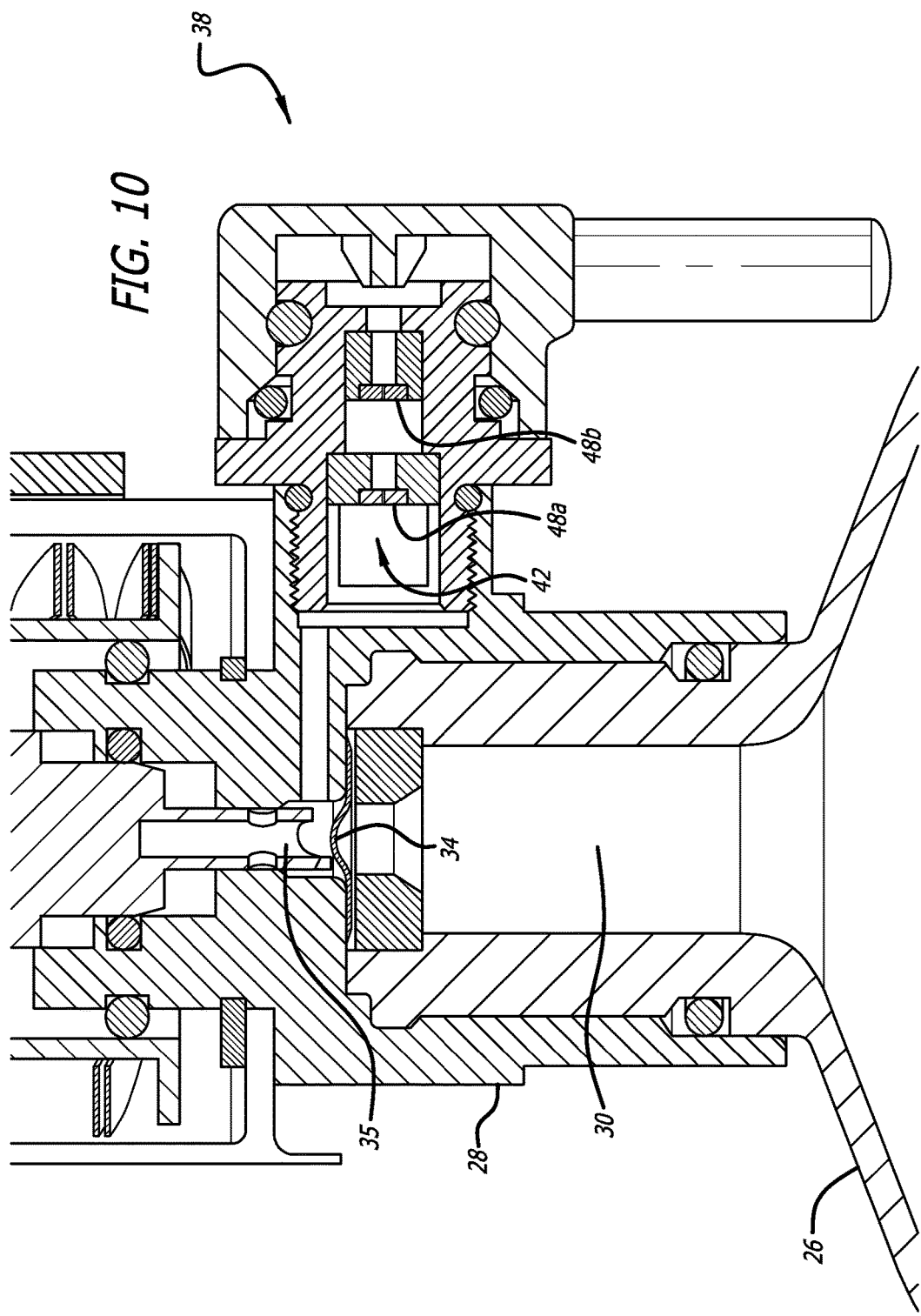
FIG. 10 is a sectional view illustrating the oxygen flow path in a manifold including multiple flow control orifices in the oxygen flow path connected with the opening of the oxygen storage vessel of FIG. 3, according to the present invention.
Figure 13:
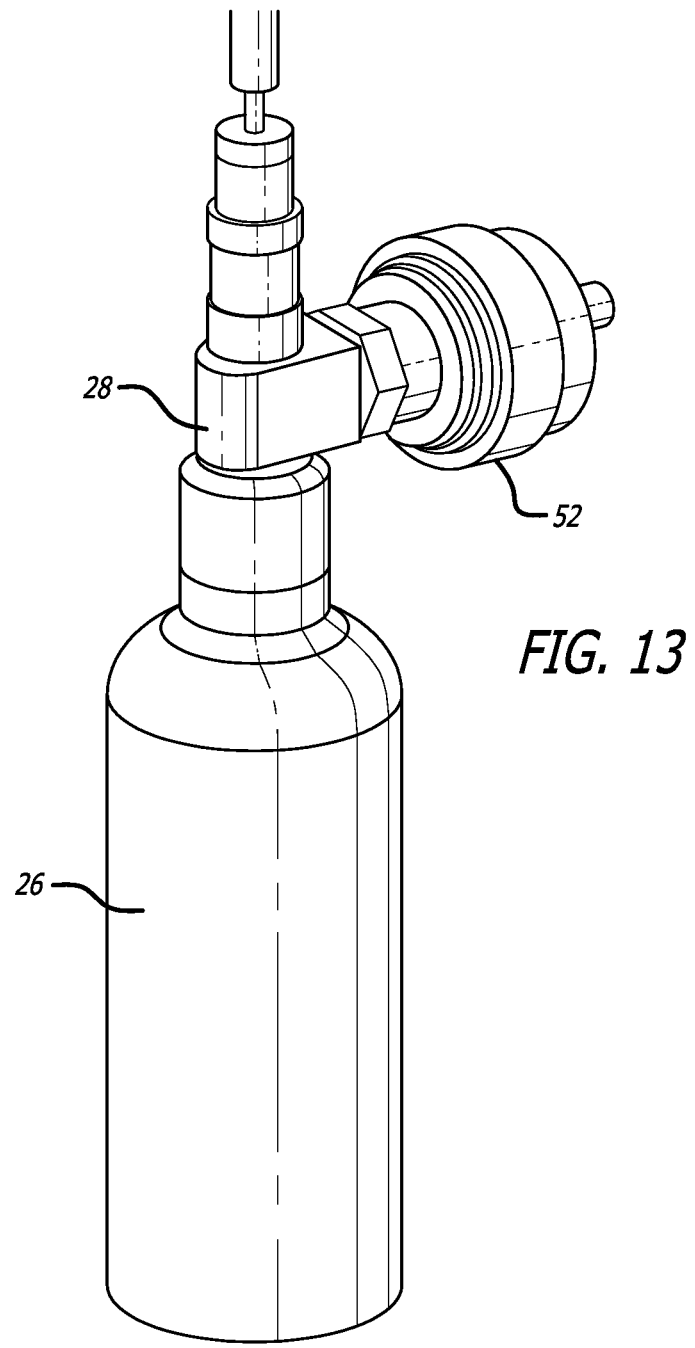
FIG. 13 is a perspective view illustrating a manifold including a pressure reducing variable orifice in the oxygen flow path connected with the opening of the oxygen storage vessel of FIG. 3, according to the present invention.

Referring to FIGS. 8-10, in a presently preferred aspect, the one or more oxygen flow rate control orifices include a single flow control orifice 46. In another presently preferred aspect, the one or more oxygen flow rate control orifices include a plurality of flow control orifices 48a, 48b, which preferably are arranged sequentially in the flow path. In another presently preferred aspect, illustrated in FIG. 13, the one or more oxygen flow rate control orifices can include a variable orifice 52, such as a pressure reducer valve, for example, configured to control oxygen flow rate and pressure through the outlet to deliver a defined amount of oxygen to support human physiological sustenance requirements at defined aircraft altitudes, time intervals and aircraft decent profiles, or time release characteristics. In another presently preferred aspect illustrated in FIG. 3, the outlet of the manifold includes a swivel connector fitting 54 configured to be connected to one or more outlet hose or oxygen distribution tubes 56 for one or more breathing masks configured to be used in the aircraft lavatory. The swivel connector fitting preferably is configured to rotate 360 degrees. In another presently preferred aspect, the one or more oxygen distribution tubes are removably attached to the outlet, such as by one or more removably attachable connectors 58, which can be removably connected directly to the outlet, between portions of the one or more oxygen distribution tubes, and can be removably connected to an oxygen reservoir bag 59 of a breathing mask, or directly to a breathing mask. In this manner, the one or more breathing masks can be connected to receive the flow of oxygen at the second oxygen pressure from the outlet of the manifold, and can be released to drop down from the oxygen module, such as in the event of decompression of the aircraft at high altitudes.

Referring to FIG. 8, in a presently preferred aspect, the oxygen storage vessel is formed of metal, such as a corrosion resistant stainless steel cylinder, and the actuator includes a metal wedge shaped needle 60, which is typically hollow and typically includes one or more ports configured to be connected to the flow channel in the manifold. The metal wedge shaped needle is configured to mechanically break the frangible disk, and the opening of the oxygen storage vessel is formed of metal, wherein the actuator is configured to wedge the metal wedge shaped needle into the metal opening of the oxygen storage vessel, such that the metal wedge shaped needle and the opening of the oxygen storage vessel form a metal on metal wedge seal 61 upon activation of the actuator configured to guide a flow of oxygen from the oxygen storage vessel through the outlet.

With reference to FIG. 4, in one presently preferred aspect, the actuator can include a spring loaded mechanism 62 configured to cause the needle to puncture the pressure seal, wherein the spring loaded mechanism provides a spring force sufficient to force the needle through the pressure seal to allow oxygen to flow through the flow path. In another presently preferred aspect, the spring loaded mechanism comprises a wave spring 64 configured to create the activation force.

Figure 5A:
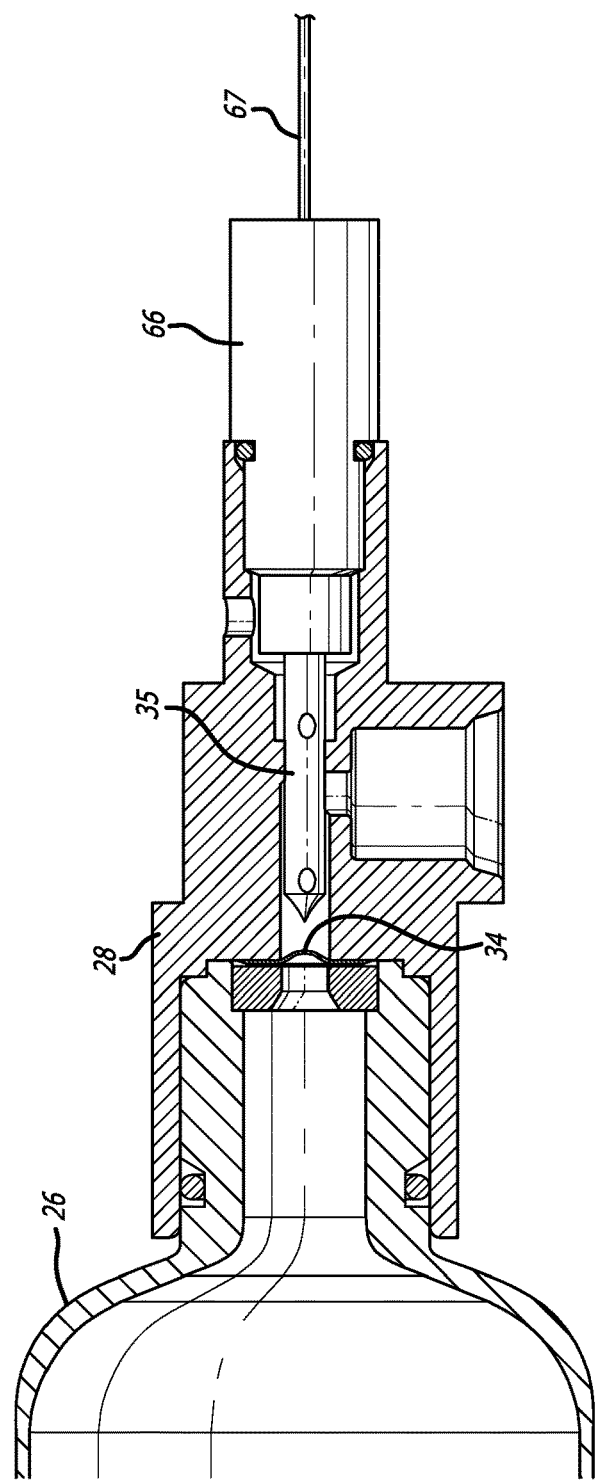
FIG. 5A is a sectional view illustrating a pyrotechnic actuator mechanism for breaking a pressure seal of the oxygen storage vessel of FIG. 3 to initiate a flow of oxygen, according to the present invention.
Figure 5B:
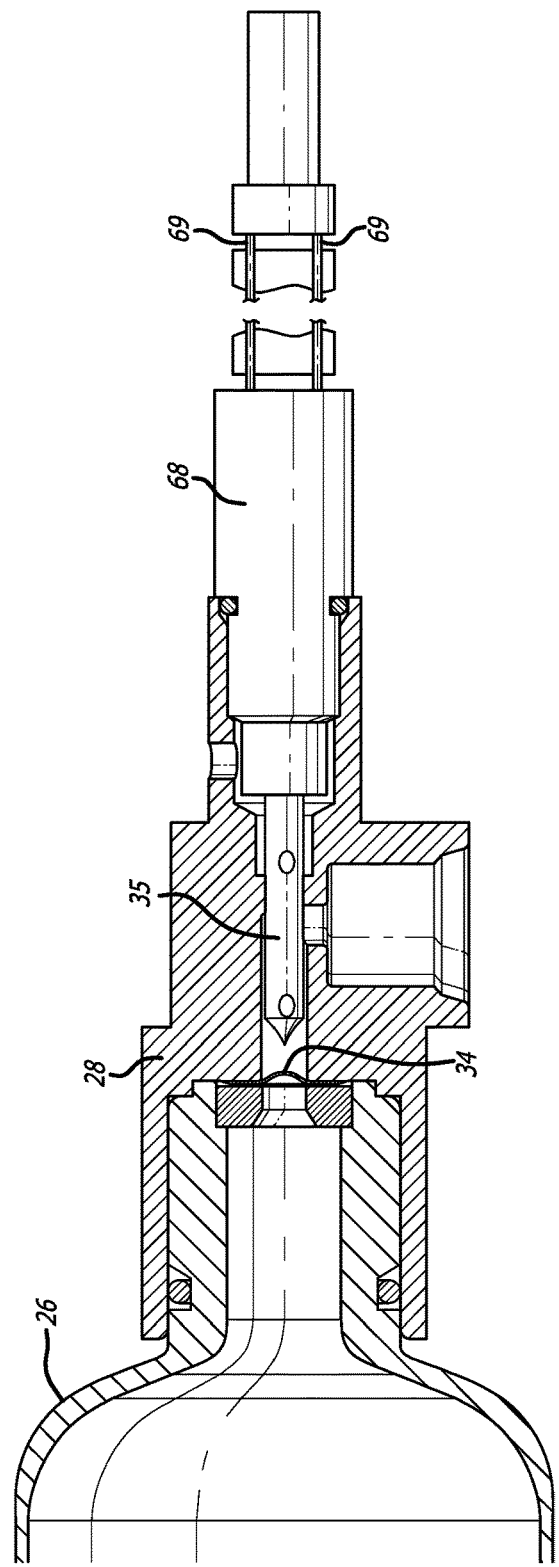
FIG. 5B is a sectional view illustrating an electrically powered solenoid actuator mechanism for breaking a pressure seal of the oxygen storage vessel of FIG. 3 to initiate a flow of oxygen, according to the present invention.
Figure 5C:
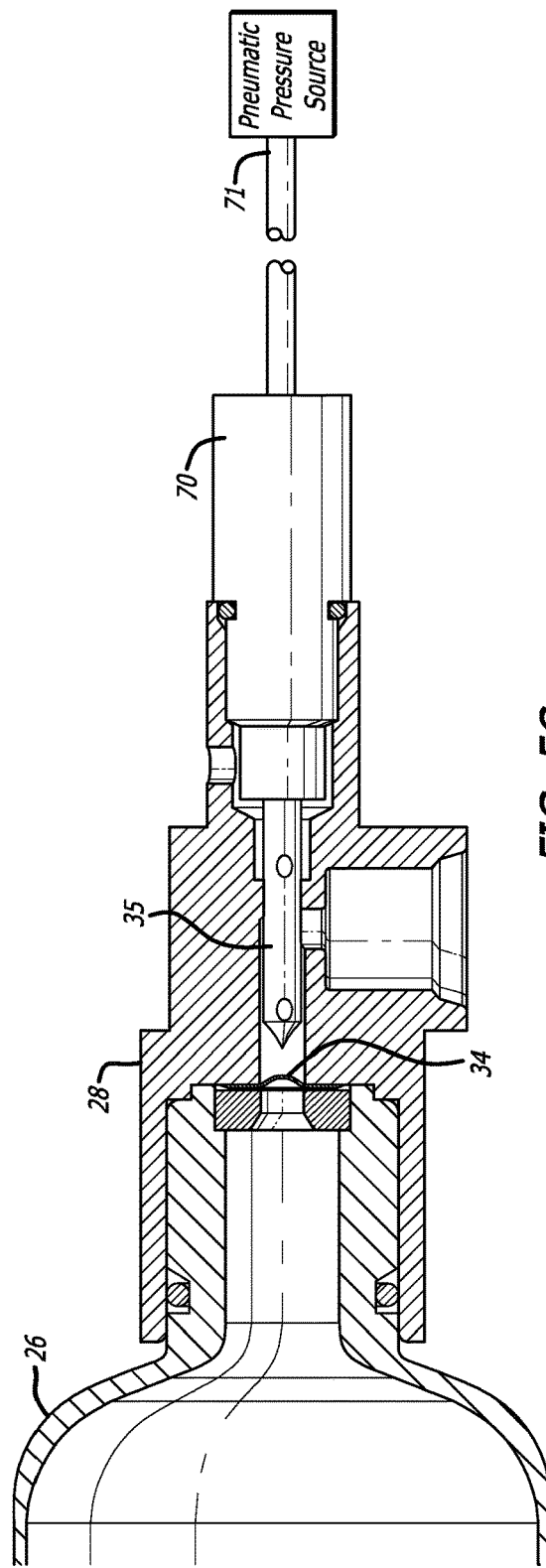
FIG. 5C is a sectional view illustrating a pneumatic pressure initiated actuator mechanism for breaking a pressure seal of the oxygen storage vessel of FIG. 3 to initiate a flow of oxygen, according to the present invention.

As is illustrated in FIG. 5A, in another presently preferred aspect, the actuator can be a pyrotechnic mechanism 66 connected to receive an activation control signal 67 and configured to initiate the flow of high pressure oxygen causing the needle to puncture the pressure seal, by providing a force sufficient to force the needle through the frangible disk allowing oxygen to flow forces needle through the frangible disk allowing oxygen to flow. As is illustrated in FIG. 5B, in another presently preferred aspect, the actuator can be an electrically powered solenoid 68 having electrical connections 69 connected to receive an electrical control signal and configured to cause the needle to puncture the pressure seal, wherein the electrically powered solenoid provides a force sufficient to force the needle through the frangible disk allowing oxygen to flow. As is illustrated in FIG. 5C, in another presently preferred aspect, the actuator can be a pneumatic pressure initiated device 70 connected to receive a pneumatic activation signal 71 from a pneumatic pressure source configured to cause the needle to puncture the pressure seal, wherein the pneumatic pressure initiated device provides a force sufficient to force the needle through the frangible disk allowing oxygen to flow.

It will be apparent from the foregoing that while particular forms of the invention have been illustrated and described, various modifications can be made without departing from the spirit and scope of the invention.

We claim:

1. An aircraft lavatory oxygen source for use in an aircraft lavatory to dispense supplemental oxygen suitable for breathing by a user in small quantities, comprising:
   an oxygen storage vessel configured to store gaseous oxygen at a first oxygen pressure and having suitable purity for breathing, said oxygen storage vessel having an opening sealed by a pressure seal configured to retain high pressure oxygen in said oxygen storage vessel at the first oxygen pressure, said pressure seal being configured to seal said oxygen storage vessel against flow from said oxygen storage vessel until said pressure seal is broken;
   an actuator extending from a proximal end to a distal end adjacent the pressure seal; and
   a manifold comprising a first portion radially outward from the oxygen storage vessel and a second portion extending from the first portion and defining a channel in which the actuator moves, the manifold adjacent the pressure seal and connected in fluid communication with said pressure seal of said opening of said oxygen storage vessel and configured to receive a flow of oxygen from said opening of said oxygen storage vessel when said pressure seal is broken via a path through a port at the distal end of the actuator and separate from the proximal end of actuator, said manifold including an outlet including an oxygen flow path connected in fluid communication with said pressure seal of said oxygen storage vessel via the path through the distal end of the actuator and separate from the proximal end of actuator, the oxygen flow path extending downward towards the first portion relative to a plane between the first portion and the second portion, and said outlet of said manifold including first and second flow control orifices arranged sequentially and downstream of the actuator in said oxygen flow path, each of the first and second flow control orifices on a first side of the plane opposite the second portion, each of the first and second flow control orifices leading to a compartment in said oxygen flow path having a larger radius than the respective first or second flow control orifice, each compartment having a single compartment inlet and a single compartment outlet, the first and second flow control orifices configured to control sequentially the oxygen flow rate through the outlet of said manifold to deliver a defined amount of oxygen at a second oxygen pressure lower than said first oxygen pressure exiting the oxygen storage vessel to support human physiological sustenance requirements at defined aircraft altitudes, time intervals and aircraft descent profiles, or time release characteristics; and
   wherein the actuator is configured to break said pressure seal, said pressure seal being configured to be broken, fractured or ruptured by said actuator upon activation of the actuator to initiate a flow of oxygen through said opening of said oxygen storage vessel.

2. The aircraft lavatory oxygen source of claim 1, wherein said oxygen storage vessel is formed of metal.

3. The aircraft lavatory oxygen source of claim 1, wherein said oxygen storage vessel comprises a corrosion resistant stainless steel cylinder.

4. The aircraft lavatory oxygen source of claim 1, wherein said pressure seal comprises a frangible disk formed of frangible material configured for retaining high pressure oxygen and capable of being fractured or ruptured to open the oxygen storage vessel and initiate the flow of oxygen from said oxygen storage vessel.

5. The aircraft lavatory oxygen source of claim 4, wherein said frangible disk is compressed between the manifold and the opening of the oxygen storage vessel.

6. The aircraft lavatory oxygen source of claim 4, wherein said frangible disk provides a seal surface and rupture point for said oxygen storage vessel.

7. The aircraft lavatory oxygen source of claim 1, wherein said outlet of said manifold comprises a swivel connector fitting configured to be connected to at least one outlet hose for at least one breathing mask configured to be used in the aircraft lavatory.

8. The aircraft lavatory oxygen source of claim 7, wherein said swivel connector fitting is configured to rotate 360 degrees.

9. The aircraft lavatory oxygen source of claim 1, wherein said outlet of said manifold further comprises at least one oxygen distribution tube removably attached to said outlet.

10. The aircraft lavatory oxygen source of claim 9, wherein said at least one oxygen distribution tube comprises at least one removably attachable connector.

11. The aircraft lavatory oxygen source of claim 10, wherein said at least one removably attachable connector is removably connected to said outlet.

12. The aircraft lavatory oxygen source of claim 10, wherein said at least one removably attachable connector is removably connected between portions of said at least one oxygen distribution tube.

13. The aircraft lavatory oxygen source of claim 10, wherein said at least one removably attachable connector is removably connected to a breathing mask.

14. The aircraft lavatory oxygen source of claim 1, further comprising at least one breathing mask in the aircraft lavatory connected to receive the flow of oxygen at the second oxygen pressure from said outlet of said manifold.

15. The aircraft lavatory oxygen source of claim 1, wherein said manifold comprises a pressure relief port connected in fluid communication with said oxygen flow path.

16. The aircraft lavatory oxygen source of claim 1, wherein said actuator comprises a needle and a spring loaded mechanism configured to cause said needle to puncture said pressure seal, wherein the spring loaded mechanism provides a spring force sufficient to force the needle through the pressure seal to allow oxygen to flow through said oxygen flow path.

17. The aircraft lavatory oxygen source of claim 16, wherein said spring loaded mechanism comprises a wave spring configured to create activation force.

18. The aircraft lavatory oxygen source of claim 4, wherein said actuator comprises a needle and a pyrotechnic mechanism to initiate the flow of oxygen by puncturing said pressure seal, and said pyrotechnic device provides a force sufficient to force the needle through the frangible disk allowing oxygen to flow.

19. The aircraft lavatory oxygen source of claim 4, wherein said actuator comprises a needle and an electrically powered solenoid configured to cause said needle to puncture said pressure seal, wherein the electrically powered solenoid provides a force sufficient to force the needle through the frangible disk allowing oxygen to flow.

20. The aircraft lavatory oxygen source of claim 4, wherein said actuator comprises a needle and a pneumatic pressure initiated device configured to cause said needle to puncture said pressure seal, wherein the pneumatic pressure initiated device provides a force sufficient to force the needle through the frangible disk allowing oxygen to flow.

21. The aircraft lavatory oxygen source of claim 4, wherein said actuator comprises a metal wedge shaped needle configured to mechanically break the frangible disk, and said opening of said oxygen storage vessel is formed of metal, wherein said actuator is configured to wedge said metal wedge shaped needle into said metal opening of said oxygen storage vessel, such that said metal wedge shaped needle and said opening of said oxygen storage vessel form a metal on metal wedge seal upon activation of said actuator configured to guide the flow of oxygen from said oxygen storage vessel through said outlet.

\* \* \* \* \*